March 22, 1932.  E. R. BOOTH  1,850,070
MECHANISM FOR CONVERTING RECIPROCATING MOTION INTO ROTARY MOTION
Filed Sept. 1, 1931   2 Sheets-Sheet 1
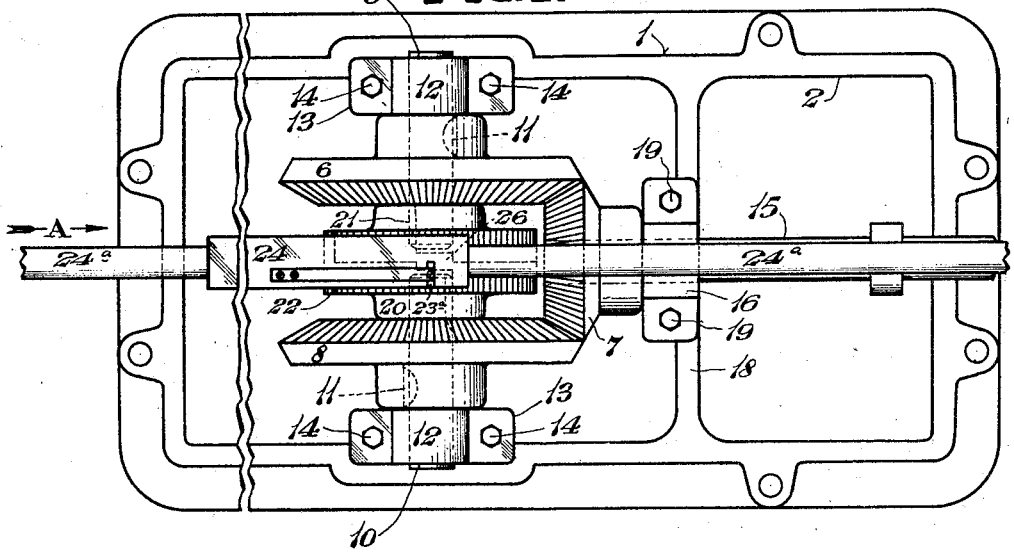
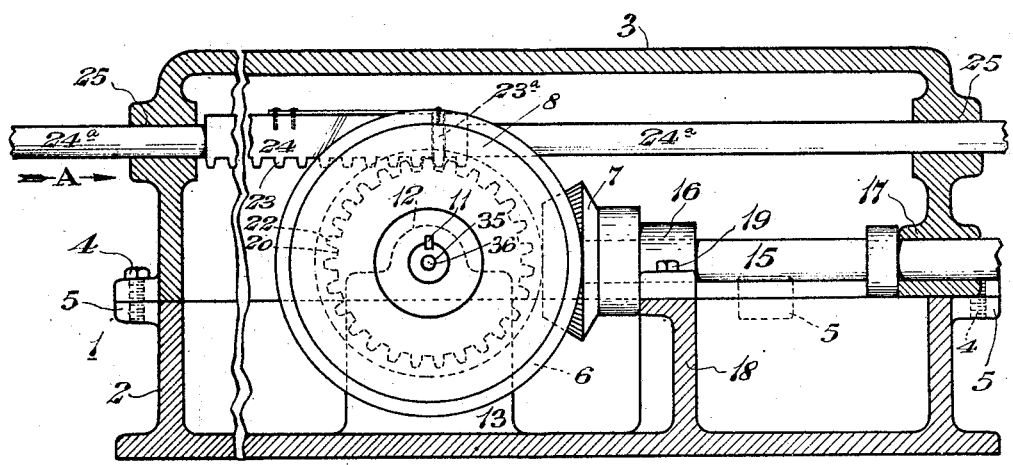
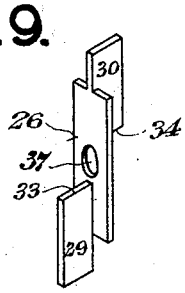
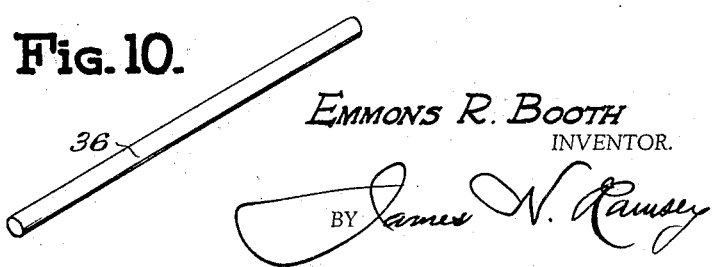
Emmons R. Booth
INVENTOR.
BY James W. Ramsey
ATTORNEY.

March 22, 1932.  E. R. BOOTH  1,850,070
MECHANISM FOR CONVERTING RECIPROCATING MOTION INTO ROTARY MOTION
Filed Sept. 1, 1931  2 Sheets-Sheet 2
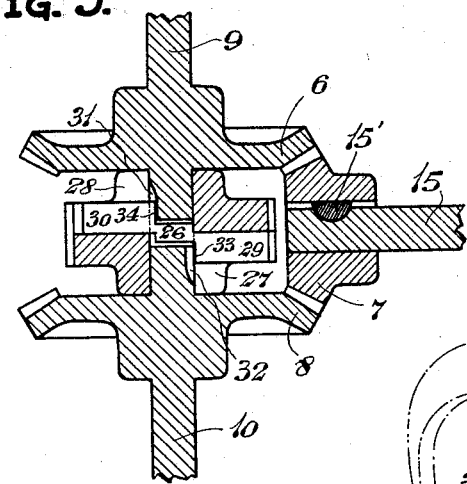
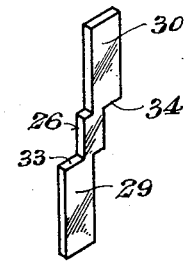
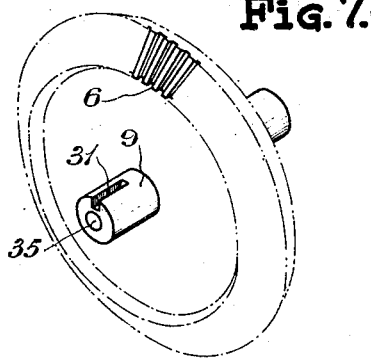
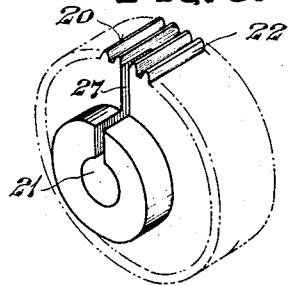
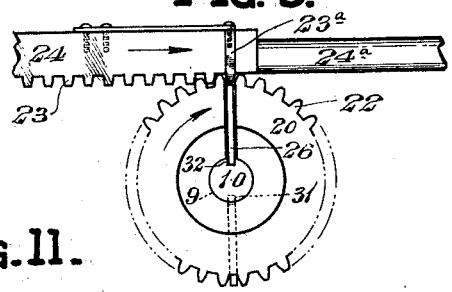
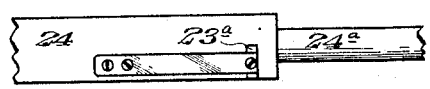
EMMONS R. BOOTH
INVENTOR.
BY *James A. Ramsey*
ATTORNEY.

Patented Mar. 22, 1932

1,850,070

UNITED STATES PATENT OFFICE

EMMONS R. BOOTH, OF CINCINNATI, OHIO

MECHANISM FOR CONVERTING RECIPROCATING MOTION INTO ROTARY MOTION

Application filed September 1, 1931. Serial No. 560,541.

This invention relates to certain new and useful improvements in mechanism for converting reciprocating motion into rotary motion.

The principal object of this invention is to provide means for converting reciprocating motion of a rack to the rotary motion of a shaft, and consists in the combination of three bevel gears held in permanent mesh with each other, one of said gears being fixed to a driven shaft and the other two gears keyed to short shafts; also a gear mounted on the inner ends of said short shafts, respectively, and in permanent mesh with teeth on a rack; also in a sliding key carried by said last-mentioned gear and adapted to lock with one of said short shafts on the forward stroke of said rack and with the other of said short shafts on the return stroke of said rack.

Other objects and advantages will be evident upon a full understanding of the nature of the sliding key, the invention residing substantially in the novel features of construction, arrangement and combination of parts constituting the device.

A preferred form of the invention is set forth in the accompanying drawings and following description, but it is to be understood that such embodiment is presented merely for the purpose of illustration and is not to be accorded any interpretation which might be calculated to limit the invention short of its true and most comprehensive scope in the art.

In the drawings:

Fig. 1 is a plan view (partly broken away) of the invention shown installed in a metal case or housing with the upper half or top of the case removed to more clearly illustrate the novel features of the device;

Fig. 2 is a side elevation of Fig. 1, the case or housing being shown in central vertical section;

Fig. 3 is a central horizontal section of the gears shown in Fig. 1 to clearly illustrate the sliding key and its connection with the short shafts;

Fig. 4 is a fragmentary side elevation (shown partly by broken lines) of the central or rack gear and a portion of the rack with the sliding key in a position parallel with said rack;

Fig. 5 is a view similar to Fig. 4 but showing the sliding key at right angles to the rack or at the changing point of the key;

Fig. 6 is an isometric detail view of the sliding key;

Fig. 7 is an isometric detail view (mostly shown by broken lines) of one of the large bevel gears;

Fig. 8 is an isometric view (mostly shown in phantom or broken lines) of the central or rack gear;

Fig. 9 is an isometric detail view showing a modification of the sliding key;

Fig. 10 is a detail view of the supporting shaft for the short shafts 9 and 10; and Fig. 11 is a fragmentary end and plan view of the rack to more clearly show one of the yielding rack teeth.

In the embodiment of my invention as illustrated and which shows a preferred construction I provide a mechanism for converting reciprocating motion into rotary motion, which mechanism is suitably mounted in a housing or case 1, said case being preferably made in two parts, such as the bottom or lower half 2 and the top or upper half 3. As shown in Fig. 2, these halves 2 and 3 of the case 1 are held together by bolts 4 threaded in the bosses 5 formed integral with the bottom 2. Gears 6, 7 and 8 are bevel gears, all of which are in constant meshing engagement, as shown in Fig. 1, the gears 6 and 8 being larger than gear 7 and fixed to short shafts 9 and 10, respectively, by keys 11—11, or can be made as an integral part of said gears, as shown in Fig. 3. These shafts 9 and 10 are rotatably mounted in bearings 12—12 fixed to pads 13 (formed integral with the lower half or bottom 2 of case 1) by bolts 14. Gear 7 is secured to the inner end of driven shaft 15 by a key 15', or equivalent means, and said shaft is rotatably journaled in bearings 16 and 17, as clearly shown in Fig. 2. Bearing 16 is supported by wall 18 formed integral with the lower half of the case 1 and fixed to said wall by bolts 19, as shown. Gear 20 is provided with a central bore 21 to receive the inner end of each shaft 9 and 10 (as best seen in Fig. 1) and teeth 22 cut on its outer periphery are adapted to receive and mesh with the teeth 23 cut on the underside of rack 24, as clearly shown in Fig. 2. The rack 24 is reciprocably mounted in bearings 25—25 formed integral with the upper half or top 3 of case 1. For assembling purposes the rod portion 24a of the rack is made as a separate part from the square portion.

Referring next to the sliding key, which is designated by the numeral 26 and shown in detail in Fig. 6, it will be noticed that said key is double-ended and substantially flat. This key is received within the slotted openings 27 and 28 in central or rack gear 20 (see Fig. 3) and its overall length is shorter than the outer diameter of gear 20 by the height of the teeth 22. Part 29 of key 26 slidably fits within the slot 27 of gear 20 and part 30 of said key slidably fits within the slot 28 of gear 20. Shafts 9 and 10 are provided with key receiving slots 31 and 32, respectively, to alternately receive the inner edges 33 and 34 of sliding key 26.

*Operation.*—The operation of my improved mechanism for converting reciprocating motion into rotary motion is as follows:

Assuming that the rack 24 is reciprocated within the bearings 25 of the upper half or top 3 of case 1, and for explanatory purposes we will assume that the rack 24 is about to be driven in the direction of arrow A, Figs. 1 and 2. This being true, the teeth 23 of said rack 24, meshing with the teeth 22 of the rack gear 20 will cause said gear 20 to be rotated one-half of a revolution in a clockwise direction, as viewed in Fig. 2, and as the inner edge 34 of key 26 is in engagement with the key receiving slot 31 in shaft 9, said shaft 9 will be rotated in a clockwise direction and as the beveled gear 6 is fixed or keyed to said shaft, it likewise will be rotated in a clockwise direction which, in turn, rotates the bevel gear 7 and the driven shaft 15. As the bevel gear 8 is in permanent mesh with the gear 7, it will likewise be rotated, but due to the fact that the edge 33 of the sliding key 26 is out of engagement with the key receiving slot 32 in the shaft 10, said gear 8 acts as an idler until the sliding key 26 assumes a vertical position, as shown in Fig. 5, at which time the yielding or spring-pressed tooth 23a of the rack 24 forces said key downwardly, thereby removing the inner edge 34 thereof from the key receiving slot 31 in shaft 9 and forcing the inner edge 33 into the key receiving slot 32 in shaft 10. The purpose of the spring-pressed or yielding teeth 23a, of which there are two within the rack 24, is that a quicker action is imparted to the sliding key at the change point.

From the foregoing description, taken in connection with the accompanying drawings, it will be readily apparent that on the forward stroke or stroke A of the rack 24, gear 20 is driven in a clockwise direction and the sliding key 26, being in engagement with shaft 9, drives bevel gear 6 in a clockwise direction, which, in turn, drives bevel gear 7 and shaft 15. On the return stroke of rack 24, gear 20 is disconnected from short shaft 9 by movement of the sliding key 26 and said gear 20 is then connected to the short shaft 10, the drive or power derived from the rack 24 to the driven shaft 15 being through gear 20, sliding key 26, short shaft 10, bevel gear 8 and bevel gear 7.

By an examination of Fig. 1, it will be noticed that the central or rack gear 20 is freely mounted upon the inner ends of shafts 9 and 10 and is alternately connected with said shafts by the movement of the sliding key 26. Due to this movement of the sliding key 26, the central or rack gear 20 is turned in a clockwise direction during one motion of the rack and in an anti-clockwise direction during the return motion of said rack.

From the foregoing explanation, it will, therefore, be seen that the reciprocating motion of rack 24 imparts a constant rotary motion to the driven shaft 15, due to the sliding key 26, which makes the gear 6 the driver and gear 8 an idler and vice versa.

While I have shown and described one particular embodiment of my invention it will be understood that various changes and modifications can be made without departing from the scope or spirit thereof as, for example, the short shafts 9 and 10 can be provided with a central hole, designated 35 in Fig. 7, to receive a supporting rod 36, as shown in Fig. 10, to further strengthen said shafts, in which case the central portion of the sliding key 26 would be slightly modified, as shown in Fig. 9, to provide the oblong opening 37 to receive the supporting rod 36 above referred to.

What I claim as new and desire to secure by Letters Patent is:

1. Mechanism for converting reciprocating motion into rotary motion comprising the combination of a driven element in the form of a rack, a pair of bevel gears, a pinion in permanent mesh with said bevel gears, an intermediate gear, the teeth of which are in constant mesh with the teeth of said rack, a driving shaft fixed to said pinion, a short shaft for each of said bevel gears, and a sliding key carried by said intermediate gear and adapted to alternately connect said intermediate gear with said bevel gears, respectively, whereby the reciprocating motion of said rack drives said pinion and attached shaft in a constant rotary motion.

2. Mechanism for converting reciprocating motion into rotary motion comprising the combination of a reciprocating driving rack, a rack gear having a keyway, the teeth of which are adapted to be in constant mesh with the teeth on said rack, a sliding key received within said keyway, a pair of bevel gears disposed on opposite sides of said rack gear, a pinion held in permanent mesh with said bevel gears, a driven shaft fixed to said pinion, and each short shaft having at the inner end thereof, whereby on the forward stroke of said rack said sliding key locks with and drives one of said short shafts and its attached bevel gear and whereby on the return stroke of said rack said sliding key locks with and drives the other of said short shafts and its attached bevel gear to thereby transmit a constant rotary motion to said pinion and driven shaft from the reciprocating motion of said rack.

3. Mechanism for converting reciprocating motion into rotary motion comprising the combination of a two part case, a driving rack reciprocably mounted therein and having driving teeth on the underside thereof, a pair of bevel gears, a shaft for each bevel gear having a keyway and rotatably mounted within said case, a pinion in permanent mesh with said bevel gears, a driven shaft rotatably mounted in said case and fixed to said pinion, a rack gear freely mounted on the inner end of said bevel gear shafts, and a key slidably mounted within said rack gear whereby during the forward motion of said rack said rack gear drives one of said bevel gear shafts through said key and whereby on the return stroke of said rack said rack gear will drive the other of said bevel gear shafts to thus convert the reciprocating motion of said rack into a constant rotary motion of said driven shaft, substantially as described.

4. Mechanism for converting reciprocating motion into rotary motion comprising the combination of a driving rack, a pair of bevel gears, a pinion in permanent mesh with said beveled gears, an intermediate gear in constant mesh with said rack, a driven shaft fixed to said pinion, a short shaft for each of said bevel gears, a central bore in each short shaft, a supporting shaft inserted within the central bore of each short shaft and a sliding key carried by said intermediate gear and having a clearance opening therein to receive said supporting shaft whereby said sliding key is adapted to alternately connect said intermediate gear with said beveled gears through said short shafts whereby the reciprocating motion of said rack drives said pinion and attached shaft in a constant rotary motion, substantially as set forth and for the purposes specified.

5. Mechanism for converting reciprocating motion into rotary motion comprising the combination of a driven element in the form of a rack, two of the teeth of which are yieldably mounted, a pair of bevel gears, a pinion in permanent mesh with said bevel gears, an intermediate gear, the teeth of which are in constant mesh with the teeth of said rack, a driving shaft fixed to said pinion, a short shaft for each of said bevel gears and a sliding key carried by said intermediate gear and adapted to alternately connect said intermediate gear with said bevel gears, respectively, whereby the reciprocating motion of said rack drives said pinion and attached shaft in a constant rotary motion.

EMMONS R. BOOTH.